United States Patent Office 2,880,179
Patented Mar. 31, 1959

2,880,179

METHOD OF OBTAINING A TWO PHASE SYSTEM OF ARTIFICIAL IMMISCIBILITY

Michel Comar, Casablanca, Morocco

No Drawing. Application February 17, 1955
Serial No. 489,001

Claims priority, application France February 2, 1954

6 Claims. (Cl. 252—364)

This invention relates generally to selective extraction applicable to enriching and purifying treatments.

In my prior application, Serial No. 227,735, filed May 22, 1951, I have described and claimed a process for the separation of mixtures of substances which is applicable for example to the purification of organic substances and which consists in introducing this substance with its impurities, or this mixture of substances, under the proper physical conditions (pH, temperature, etc.) for ensuring their separation, into a two phase liquid system which itself is obtained by putting together two liquids which are miscible with each other and a solid which is soluble in one of them and insoluble in the other, or into one phase of this system, which is subsequently placed in contact with the other phase.

The present invention has for an object to provide a relatively convenient method by which the constituents of the two-phase system can be qualitatively and quantitatively determined in practice, a subsidiary object being to determine more precisely the useful range of application of this process.

For this purpose, the above general principle will be illustrated by various examples of fractionation of substances having similar physical, chemical or physicochemical characteristics, these examples having been chosen from widely diverse branches of chemistry and more particularly amongst those concerning the separation of substances which are water-soluble either by nature or by virtue of the conditions in which they are, these substances being present either in the state of substances already purified or pure or in the form of raw material from which the first fractionations are to be carried out.

For each of these examples there will first be formulated the general (overall) composition of the selected artificial immiscibility system so arranged as to obtain optimum equilibrium between the two phases, this optimum being confirmed by tests in the course of which any volume of one phase is placed together with any desired volume of the other phase without alteration of the relative volumes after agitation and settling. In all those examples the relation between parts in weight and in volume will be that of grams and cubic centimetres.

In order to obtain such a system of immiscible phases (this immiscibility being the feature which such a system must possess for counter-current operation), one proceeds according to the invention in the following manner: decreasing quantities of a concentrated solution of the solid in the dissolving liquid (for example water and a water-soluble salt) are diluted with increasing quantities of the dissolving liquid, and to each of these mixtures of decreasing content of dissolved solid so much is added of the other liquid, in which the solid is insoluble, that a chosen typical proportion of the two phases is obtained; in practice equality of the phases is chosen. One adds on the one hand the volumes of the various concentrated solutions and on the other hand volumes of the dissolving liquid, and finally the various volumes of the non-dissolving liquid; and from this one deducts the mean value from which one can ascertain by calculation the relative proportions of the solid and of the two liquids in a manner of which an example will be given further below:

Similarly one repeats the same operations, utilising mixtures with inversely increasing and decreasing proportions of the two liquids, while introducing into these various mixtures a concentrated solution of the solid, until one obtains, as above, equality of the phases for each of these mixtures.

By calculating once more a mean value amongst the various results, one obtains finally a new proportion between the three constituents of the artificial immiscibility system. One establishes then the mean value of the first and second relation and obtains a formula which in most cases will satisfy the tests of immiscibility.

All that has been said up to now is obviously only true when these operations are carried out inside the two limits of possibility, namely beginning with a maximum concentration of solid not leading to crystallisation of the latter by the addition of the non-dissolving liquid, and on the other hand to a minimum concentration of solid in which the equality of phases, here required as test, is no longer obtainable. This definition of the two limits is essential.

It has been found that one obtains maximum precision if one first determines with maximum precision these two extreme limits. Naturally it is desirable to multiply the number of measurements between these two limits, but it remains possible to carry out the analysis described by knowing that the optimum is already approximately defined by the test halfway between these two limits.

The following table, which is set up for the case of the system isopropyl alcohol-water-sodium sulphate, records the results obtained in these two series of operations and the two primary mean values from which the optimum mean value is drawn.

In these tables, it will be noted that those equalibria at which crystallisation of the solid takes place must not be retained; when crystallisation no longer takes place, one enters into the real possibilities of an artificial-immiscibility system; similarly on the other hand progressive addition of the liquid which dissolves the solid, and which is miscible with the other liquid, will lead eventually to the impossibility of obtaining equality of the phases, which is assumed to be the chosen type of equilibrium.

EXAMPLE A

System sodium sulphate-water-isopropanol at 35° C. concentrated solution:

$Na_2SO_4$, 34.10 g.; water, 91 cm.$^3$=100 cm.$^3$ at 35° C.

Table I

| Solution of $Na_2SO_4$ | Water | Isopropanol |
|---|---|---|
| 10 | 0 | Crystals |
| 9.5 | 0.5 | 5.90 |
| 9 | 1 | 5.60 |
| 8.5 | 1.5 | 5.80 |
| 8 | 2 | 5.50 |
| 7.5 | 2.5 | 5.20 |
| 7 | 3 | 4.90 |
| 6.5 | 3.5 | 4.70 |
| 6 | 4 | 4.40 |
| 5.5 | 4.5 | 4.30 |
| 5 | 5 | 4.10 |
| 4.5 | 5.5 | 3.80 |
| 3.8 | 6.8 | Impossible |
| Total 81 | 39 | 57.80 |

Table II

| Isopropanol | Water | Solution of $SO_4Na_2$ |
|---|---|---|
| 9 | 1 | Crystals |
| 8.5 | 1.5 | 13.20 |
| 8 | 2 | 12.00 |
| 7.5 | 2.5 | 10.80 |
| 7 | 3 | 9.70 |
| 6.5 | 3.5 | 9 |
| 6 | 4 | 8 |
| 5.5 | 4.5 | 7 |
| 5 | 5 | 6 |
| 4.5 | 5.5 | 5 |
| 4 | 6 | 4 |
| 3.5 | 6.5 | Impossible |
| Total 62.5 | 37.5 | 84.70 |

Constituents, the value for water being reduced to unity, and the sulphate in dry weights.

| | $Na_2SO_4$ | Water | Isopropanol |
|---|---|---|---|
| Table I | 0.245 | 1 | 0.511 |
| Table II | 0.252 | 1 | 0.545 |
| Mean | 0.2485 | 1 | 0.528 |

Verification by synthesis: by mixing 2.48 g. of $Na_2SO_4$, 10 cc. of water, and 5.28 cc. of isopropanol, one obtains two phases each of 7.4 cc.; if one removes one cc. of the upper phase and adds to it 5 cc. of the lower phase, one will find after agitation and settling that the volumes have a proportion 1:5. Similarly, if one removes 5 cc. of the upper phase and adds to it one cc. of the lower phase, one finds after agitation and settlement that the volumes are in the proportion 5:1. This proves that the two phases are mutually immiscible.

Under these conditions one ascertains by analysis the composition of each of the phases and is then able to reconstitute these phases separately in order to carry out operations such as extraction, purification, etc.

A very great variety of artificial immiscibility systems can be produced. It has already been observed that the possibilities of artificial immiscibility with water and water miscible liquids were the greater as the number of carbon atoms of said liquids was higher.

Similarly it appears that in general the possibilities of the immiscibility between water and water miscible solvent depended to a great extent upon the degree of affinity for water of the solids soluble therein. But this rule is not absolute, since other considerations may intervene, for example low degree of solubility of the solid in the water miscible solvent, etc.

In the following table marked Example B approximately 70 different cases are combined. This table bears witness to the exceedingly great number of the possibilities of attaining artificial immiscibility. In this table the cases in which immiscibility has not been obtained are indicated by an "0," and the cases in which it has been obtained are marked by a "+." The cases in which the constituents enter into chemical reaction with each other are crossed out.

While the table generally has been established at ordinary temperature, in certain cases, in which immiscibility occurs only at a higher temperature, this temperature has been indicated.

The selection of a system of artificial immiscibility adapted to permit optimum separation of two given sub-

EXAMPLE B.
FACILITY INCREASING WITH INCREASING NO. C ⟶

| INCREASING FACILITY ↓ / Water + | Formic Acid | Acetic Acid | Methyl Alcohol | Ethyl Alcohol | Propionic Acid | Acetone | Isopropyl Alcohol | Propyl Alcohol | Buturic Acid |
|---|---|---|---|---|---|---|---|---|---|
| $K_2CO_3$ | ✗ | ✗ | + | + | ✗ | + | + | + | ✗ |
| $Na_2S_2O_3$ | ✗ | ✗ | +>44° | + | ✗ | + | + | + | ✗ |
| $NH_4 2SO_4$ | 0 | 0 | 0 | + | + | + | + | + | + |
| $MgSO_4$ / $ZnSO_4$ | 0 | 0 | +>120° | +>31° >44° | + | + | + | + | + |
| $MgCl_2$ / $CaCl_2$ / Saccharose | 0 | 0 | 0 | 0 | + | + | + | + | + |
| NaCl / $NH_4Cl$ | 0 | 0 | 0 | 0 | 0 | + | + | + | + |
| KCl / $Na_2CO_3$ | 0 | 0 | 0 | 0 | 0 | + | + | + | + |
| $Na_2SO_4$ | 0 | 0 | 0 | 0 | 0 | +>27° >30° | +>28° | + | + |
| Glucose | 0 | 0 | 0 | 0 | 0 | 0 | +>43° | + | + |
| $Al_2(SO_4)_3$ | 0 | 0 | 0 | 0 | 0 | +>100° | +>70° | +>50° 55° | + |
| $NaHCO_3$ | ✗ | ✗ | 0 | 0 | ✗ | 0 | 0 | + | ✗ |
| $K_2SO_4$ | 0 | 0 | 0 | 0 | 0 | 0 | 0 | +>45° | + | stances to be introduced into the system can be made on the basis of various considerations, and while the example which will be given further below, viz. that of the separation of amino acids may serve as a guide, the coefficient of selectivity, that is to say the ratio of the distribution coefficients to two given substances in an artificial immiscibility system contemplated as suitable cannot be predicted a priori; moreover there exist unpredictable affinities for substances which would appear to be close to each other, while on the other hand substances of characters which at a first glance would appear more apart, must be subjected to systematic tests in a great number of systems before a system is discovered which satisfies the requirements of a given object; preferably this object relates to the possibility of separating in one operation two substances by trying to find in respect of one of these a zero distribution coefficient to the benefit of the upper phase or of the lower phase. When on the other hand the substances are extremely close, one will have to be satisfied with a simple coefficient of selectivity which however in the majority of cases will still be sufficiently favourable when the selectivity is of the order of one or two (such as is for example the case in the separation of leucine and isoleucine as indicated further below). These selectivity coefficients have the more practical value as the distribution coefficient of the two substances or of one of the two substances is approximately unity.

It is thus advisable to carry out a preliminary study of the distribution coefficients and for this purpose only small quantities of the substances to be separated (for example less than 2% of the overall two-phase volume submitted to the test) are introduced into the various systems taken into consideration, in order to avoid the risk of the theoretic distribution coefficients being modified by disturbing characteristics or even constituents of the substances in the chosen artificial immiscibility system. Alternatively the equilibrium will have to be studied as above, keeping count of all these constituents, whereupon the distribution coefficients can be modified, which will be generally necessary in industrial execution. An example of the modification which the substance dealt with may produce as regards the constitution of an artificial immiscibility system and thus the distribution coefficient, in the case of saccharose, introduced into an equilibrium of calcium chloride, water, and acetone.

In such a system the distribution coefficient of saccharose when introduced in the above indicated small proportions is zero to the disadvantage of the upper phase, a proportion which may be represented by the portion 0/N. If the quantities of saccharose are increased, the constitutional equilibrium of the system must be reconsidered while the saccharose starts to pass into the upper phase; in the extreme case the saccharose actually forms with water and acetone an artificial immisicibility in which saccharose is represented in abundant quantity in both phases, in a proportion of approximately 1 to 5.4.

Between these proportions of 1 to 5.4 and 0/N, various equilibria may be obtained wherein the saccharose and the calcium chloride are present in various proportions, and as a result one can obtain the whole range of distribution coefficients for the saccharose between these two extreme values; these different proportions of saccharose and calcium chloric must first form the object of a study of complex artificial immiscibility constitution carried out in the manner of Table 1. If one introduced into these equilibria a relatively closely related substance, such as ascorbic acid, one will find that the distribution coefficients of the latter, although developing in the same sense, do not by a long way reach the differences observed for saccharose. This phenomenon is utilised in order to modify the selectivity coefficient of the two substances in a favourable manner.

| Proportions | Overall composition of the system | Distribution coefficients— Saccharose Ascorbic Acid | | Selectivity coefficient for Saccharose/ Ascorbic Acid |
|---|---|---|---|---|
| Saccharose, 4 CaCl₂, 1 | Saccharose, 0.8 CaCl₂, 0.2 Water, 1 Acetone, 2.3 | 1/32 | 1/1.14 | 1/28 |
| Saccharose, 2 CaCl₂, 1 | Saccharose, 0.55 CaCl₂, 0.275 Water, 1 Acetone, 2.06 | 1/58 | 1/1.36 | 1/42 |
| Saccharose, 1 CaCl₂, 1 | Saccharose, 0.33 CaCl₂, 0.33 Water, 1 Acetone, 2.24 | 1/226 | 1/1.8 | 1/126 |
| Saccharose, 0.5 CaCl₂, 1 | Saccharose, 0.31 CaCl₂, 0.62 Water, 1 Acetone, 2.45 | 1/660 | 1/3.6 | 1/183 |

In the following examples there will be formulated in succession:

(1) The relations between the three constituents in order to obtain equilibrium of the type which shall not be perturbed by the substances to be separated and in fact not modified when as mentioned above, these substances are introduced in weak quantities, then:

(2) The distribution coefficients of the substances which are required to be separated, it being understood that from the point of view of the indicated systems and of the obtained distribution coefficients the question is not necessarily that of describing optimum separation conditions of the considered substances.

EXAMPLE 1

*Separation of ferric chloride and of aluminium chloride in solution (acid reaction)*

With the following system:

NaCl ---------------------------------------- 0.20
Water --------------------------------------- 1
Acetone ------------------------------------- 1.53 the following distribution coefficients were obtained at 35° C.

$$\text{For the ferric chloride } \frac{19}{1}$$

$$\text{For the aluminium chloride } \frac{0(\text{traces})}{N}$$

EXAMPLE 2

*Fractionation in raw materials or vegetable and animal extracts*

(a) Case of the purification of insulin:

The extraction of pancreas by water miscible solvents produces after filtration and concentration a mixture formed of water-soluble substances (salts, organic substances, etc.), pseudo-solutions (proteins, including insulin, and related substances), and water-insoluble, substances more particularly lipides.

All these substances form amongst themselves complex associations resulting in mutual solubility the outcome of which is resistance more particularly to the elimination of the lipides, while on the other hand the elimination of the latter is indispensible in order to permit the further purification of the insulin by separation from the other proteins.

The combination of a demixing operation such as water-acetone-petroleum ether, and of an artificial immiscibility system, such for example as ammonium sulphate-water-acetone, leads to a three-phase system permitting to separate jointly and at the same time the proteins and the lipides, the former distributing themselves between the central and the lower phases.

The principal constitution of such a system is for example as follows:

| | |
|---|---|
| $(NH_4)_2SO_4$ | 0.3 |
| Water | 1 |
| Acetone | 0.9 |
| Petroleum ether | 0.6 |

Three phases are formed, each having a volume of approximately 0.86; the upper phase contains all the lipides, and in a slightly acid medium having a pH between 5 and 6 the proteins distribute themselves amongst the medium and lower phase in proportions of approximately 5/1.

(b) Case of the purification of substances contained in the liver tissue:

Very finely ground liver pulp is introduced into a three-phase system analogous to the one mentioned above; the upper phase is of golden yellow colour and contains in particular all the lipides; in the pale green central phase and in the brown-red opalescent lower phase those substances are distributed which after purification will become the purified liver extracts.

(c) Case of vegetable pulp:

Into a similar three-phase system finely ground carrot pulp is introduced (or the water of this pulp is utilised as the aqueous constituent of this system).

One obtains in the upper phase all the carotene while all the insoluble residues are found placed between the central and lower phases (this is also the case in the two preceding cases).

(d) Case of the extraction of chlorophyll from leaf pulp:

The chlorophyll in its totality into the upper phase.

In the cases mentioned a three-phase system offers very great advantages because the artificial-immiscibility system fixes the water in some manner, ensuring for the demixing maximum efficiency in one single operation without the necessity of preceding the operation by concentration or following it up by the usual long exhaustions. Moreover by giving the various constituents of a starting material each its proper place in one of the phases by reason of their respective affinity for the different phases, one avoids the usual retaining effects which are detrimental to the output and industrial economy and due to the parasitic gluey masses of the extractions of biological raw materials. Finally the upper phase is no longer contaminated by residues of starting materials or distillation residues, since these place themselves between the central and lower phases.

EXAMPLE 3

Separation of amino acids

Due to the fact of their close structural relationship and the fact that their principal chemical functions are similar, the amino acids may serve as a suitable example for the separation of closely related substances; in general the ease of such separation depends on the degree of closeness of relationship of the amino acids which are to be separated in a mixture.

(a) Case of the separation of two amino acids of the same sub-group; acyclic diamino acids such as lysine and arginine, which have two differences, namely one in respect of a $CH_2$ group located in the chain connecting the three principal groups and the other in respect of the replacement of a guanidine group by an amino group.

When using the system

| | |
|---|---|
| $M_gSO_4$ crystal | 0.50 |
| Water | 1 |
| Isopropyl alcohol | 0.62 | at 30° C. in an ammoniacal medium, approximately N/10, the distribution coefficients are as follows:

| | |
|---|---|
| Lysine | 1/1.5 |
| Arginine | 1/7.2 |

(b) Case of the separation of two homologues which are only distinguished by a methylene group, which however is located in the main structure (armature), spacing in practice two principal carboxyl groups; viz: aspartic acid and glutamic acid.

Using the above mentioned system but at pH 3.2, the distribution coefficients are as follows:

| | |
|---|---|
| Aspartic acid | 0/N |
| Glutamic acid | 1/7.2 |

(c) Case of a closer relationship: glycocoll and alanine; in this case the difference of constitution relates to a $CH_3$ group in a side chain.

When using the system

| | |
|---|---|
| $(NH_4)_2SO_4$ | 0.33 |
| Water | 1 |
| Ethanol | 0.57 | at 40° C. and at pH 6.8, the distribution coefficients are

| | |
|---|---|
| Glycocoll | 1/3.8 |
| Alanine | 1/1.8 |

(d) Case of an extremely close relationship; isomery relating to a structural detail of a lateral chain: leucine and isoleucine.

When using the system

| | |
|---|---|
| $Na_2CO_3$ | 0.250 |
| Water | 1 |
| Isopropyl alcohol | 0.561 | at 35° C. and in a constitutionally alkaline medium, the distribution coefficients are as follows:

| | |
|---|---|
| Leucine | 3.9/1 |
| Isoleucine | 1.45/1 |

(e) By the following example it may moreover be shown by way of general indications that in the majority of the hitherto studied cases the distribution coefficients vary progressively along the whole of a given chemical series. Thus in a balanced system constituted by KCl (0.24), water (1), and isopropanol (0.91) the following distribution coefficients have been found at 45° C.:

| | |
|---|---|
| Clycocoll | 1/77 |
| Alanine | 1/20 |
| Valine | 1/4.6 |
| Isoleucine | 1/2 |
| Leucine | 1/1.7 |

EXAMPLE 4

Separation of two alkaloids of a similar isoquinoleinic constitution, obtained from a starting material (hydrastis extract): berberine and hydrastine in the state of sulphates When using the system

| | |
|---|---|
| KCl | 0.21 |
| Water | 1 |
| n-Propyl alcohol | 0.89 | at 45° C. and in a sulphuric medium approximately N/10, the distribution coefficients are:

| | |
|---|---|
| Berberine sulphate | 13/1 |
| Hydrastine sulphate | 4/1 |

EXAMPLE 5

Separation of two glucosides from their starting substances (aloe): barbaloin and isobarbaloin The aloe is introduced into the following system at 35° C., viz:

| | |
|---|---|
| NaCl | 0.20 |
| Water | 1 |
| Acetone | 1.53 |

The aloe dissolves totally (apart from some brownish flakes which remain at the surface separating the two phases) and becomes distributed amongst the two phases each of which assumes a dark colour but of different shades; the distribution coefficient is as follows:

Barbaloin ............................. Approx. 2.7/1
Isobarbaloin .......................... Approx. 1/1

EXAMPLE 6

*Extraction of a hormone: adrenalin from an extract of suprarenal glands*

The liquid obtained by maceration of suprarenal glands with water and water-miscible solvent in an acid medium is filtered and concentrated; the concentrate is introduced into the following system:

MgSO$_4$ ................................. 0.50
Water .................................... 1
Isopropyl alcohol ........................ 0.62 the distribution coefficient at 30° C. and pH 5.8 is 1/2.5.

EXAMPLE 7

*Vitamins B$_1$ and B$_2$*

Using the system MgSO$_4$ water-isopropyl alcohol as above at 30° C. and pH 3.8, the distribution coefficients are as follows:

For vitamin B$_1$ .......................... 1/1.4
For vitamin B$_2$ .......................... N/0 (traces)

While it is generally preferred to use the method as hereinabove described for preparing the two phase system of artificial-immiscibility, it will be appreciated that in the various separation methods herein described any two-phase system constituted by a solid, a dissolvent liquid in which the solid is soluble, and a non-dissolvent liquid in which the solid is insoluble can be used, provided its phases have been found to be immiscible with each other in the sense of not changing their relative quantities when added to each other in different proportions and allowed to settle.

What I claim is:

1. A method of providing a two-phase liquid system of artificial immiscibility by selecting as the constituents for said system a normally solid solute, a first liquid in which solid solute is soluble, a second liquid which is miscible with said first liquid but in which said solute is insoluble, preparing a plurality of mixtures of different proportions of a first one and a second one of said constituents not being mixtures of said solute with said second liquid, adding to each of said mixtures so much of the third one of said constituents as to produce a preliminary two-phase system in which the quantities of the two-phases have a predetermined relation and preparing said two-phase liquid system of artificial immiscibility by mixing said first liquid, said second liquid, and said solute in relative proportions which at least approximately correspond to the mean value of their relative proportions in those of the preliminary two-phase systems in which no precipitation of the solute has been observed, so that the two-phases of said system of artificial immiscibility can be used as selective solvents for the separation of substances.

2. A method of obtaining a two-phase liquid system of artificial immiscibility the two phases of which are suitable for use as selective solvents in the separation of substances, comprising selecting a solid, a first liquid in which said solid is soluble, a second liquid which is miscible with said first liquid but in which said solid is insoluble, preparing a plurality of solutions of different proportions of said solid in said first liquid, adding to each of said solutions so much of said second liquid as to produce where possible a preliminary two-phase system in which the quantities of the two phases have a predetermined relation and preparing said two-phase liquid system of artificial immiscibility by mixing said first liquid, said second liquid, and said solid in relative proportions which at least approximately correspond to the mean value of their relative proportions in those of said preliminary two-phase systems in which no precipitation of the solid has been observed.

3. A method of obtaining a two-phase liquid system of artificial immiscibility the two phases of which are suitable for use as selective solvents in the separation of substances, comprising selecting a solid, a first liquid in which said solid is soluble, a second liquid which is miscible with said first liquid but in which said solid is insoluble, preparing a plurality of mixtures of said first liquid with different proportions of said second liquid, adding to each of said mixtures so much of said solid as to produce where possible a preliminary two-phase system in which the quantities of the two phases have a predetermined relation and preparing said two-phase liquid system by mixing said first liquid, said second liquid, and said solid in relative proportions which at least approximately correspond to the mean value of their relative proportions in those of said preliminary two-phase systems in which no precipitation of the solid has been observed.

4. A method of obtaining a two-phase liquid system of artificial immiscibility the two phases of which are suitable for use as selective solvents in the separation of substances, comprising selecting a normally solid solute, a first liquid in which said solute is soluble, a second liquid which is miscible with said first liquid but in which said solute is insoluble, and a standard relation of phase quantities, preparing a plurality of solutions of different proportions of said solute in said first liquid, adding to each of said solutions so much of said second liquid as to produce where possible a first preliminary two-phase system in which the quantities of the two phases have said standard relation, determining a first mean value of the relative proportion of the first liquid, the solute and the second liquid in those first preliminary two phase systems in which no crystallisation of the solid is observed, preparing a plurality of mixtures of said first liquid with different proportions of said second liquid, adding to each of said mixtures so much of said solute as to produce where possible a second preliminary two-phase system standard relation, determining a second mean value of the relative proportions of the first liquid, the solute and the second liquid in those second preliminary two-phase systems in which no crystallisation of the solute is observed and preparing said two-phase liquid system by mixing said first liquid, said second liquid, and said solute in relative proportions which at least approximately correspond to the arithmetic mean of said first and second mean values.

5. A method as claimed in claim 1, wherein said predetermined relation is equality of the phases.

6. A method of obtaining a multi-phase liquid system of artificial immiscibility the phases of which are suitable for use as selective solvents in the separation of substances, comprising selecting a normally solid solute, a first liquid in which said solute is soluble, a plurality of second liquids which are miscible with said first liquid but not miscible with each other, and in which said solute is insoluble, and a standard relation of phase quantities, preparing a plurality of solutions of different proportions of said solute in said first liquid, adding to each of said solutions so much of said second liquids as to produce where possible a preliminary multi-phase system in which the quantities of the phases have said standard relation, and preparing said multi-phase liquid system by mixing said first liquid, said second liquids, and said solute in relative proportions which at least approximately correspond to the mean value of their relative proportions in those of said preliminary multi-phase systems in which no crystallisation of the solute and no chemical reactions between the constituents have been observed.

References Cited in the file of this patent

UNITED STATES PATENTS

| | | |
|---|---|---|
| 2,307,953 | Potter | Jan. 12, 1943 |
| 2,316,719 | Russel | Apr. 13, 1943 |
| 2,423,291 | Borglin | July 1, 1947 |

OTHER REFERENCES

Weissberger: Tech. of Org. Chem., vol. III, part I, 2nd ed., pp. 301–312, Interscience (1956).

Smith: Ind. and Eng. Chem., vol. 41, No. 12, pp. 2932–7 (1949).

Laland et al.: Acta Medica Scandinavica, vol. 88, 1936, pp. 620 to 622.

Smith: Proc. of the Biochem. Soc., October 1948, pp. VIII and IX.